UNITED STATES PATENT OFFICE.

DANIEL JONES, OF CANTON, MINNESOTA.

FUEL COMPOUND.

SPECIFICATION forming part of Letters Patent No. 680,864, dated August 20, 1901.

Application filed June 18, 1901. Serial No. 65,051. (No specimens.)

*To all whom it may concern:*

Be it known that I, DANIEL JONES, a citizen of the United States, residing at Canton, in the county of Fillmore and State of Minnesota, have invented a new and useful Fuel Compound, of which the following is a specification.

This invention relates to fuel compounds, and has for its object to provide an improved compound of this character which will give off a bright flame and an intense heat and which is inexpensive and in a loose light form, so as to be conveniently handled.

In carrying out the invention there are employed dry black earth, twelve table-spoonfuls; dry gramineous matter, ten table-spoonfuls; fat, one table-spoonful; rosin, one table-spoonful; petroleum, seven table-spoonfuls.

The foregoing ingredients are thoroughly mixed and provide a light and inexpensive fuel, which is loose, and thereby readily handled both for shipment and for feeding the fuel to a fire.

By the term "dry gramineous matter" I mean to include hay and straw as well as any ordinary grass, the same being finely cut and thoroughly dry, preferably rotted, so as to be entirely free from moisture.

The purpose of the rosin is to destroy the smell of the petroleum, which latter is used in its crude state.

What is claimed is—

1. A fuel compound, consisting of dry black earth, dry gramineous matter, fat, rosin, and petroleum.

2. A fuel compound, consisting of dry black earth, twelve table-spoonfuls; dry gramineous matter, ten table-spoonfuls; fat, one table-spoonful; rosin, one table-spoonful, and petroleum, seven table-spoonfuls.

In testimony that I claim the foregoing as my own I have hereto affixed my signature in the presence of two witnesses.

DANIEL JONES.

Witnesses:
R. W. BOSWORTH,
G. R. TERRY.